DATA EXCHANGER

Filed Dec. 20, 1963 6 Sheets-Sheet 1

INVENTORS
DONALD H. MALCOLM
FREDERICK MARVIN GREEN

BY Cushman, Darby & Cushman
ATTORNEYS

Oct. 17, 1967 D. H. MALCOLM ETAL 3,348,207

DATA EXCHANGER

Filed Dec. 20, 1963 6 Sheets-Sheet 2

INVENTORS
Donald H. Malcolm
Frederick Marvin Green

BY
Cushman, Darby & Cushman
ATTORNEYS

INVENTORS
DONALD H. MALCOLM
FREDERICK MARVIN GREEN

BY Cushman, Darby & Cushman
ATTORNEYS

INVENTORS
DONALD H. MALCOLM
FREDERICK MARVIN GREEN

BY Cushman, Darby & Cushman
ATTORNEYS

DATA EXCHANGER

Filed Dec. 20, 1963

INVENTORS
DONALD H. MALCOLM
FREDERICK MARVIN GREEN
BY
Cushman, Darby & Cushman
ATTORNEYS

INVENTORS
DONALD H. MALCOLM
FREDERICK MARVIN GREEN

BY
Cushman, Darby & Cushman
ATTORNEYS

3,348,207
DATA EXCHANGER

Donald H. Malcolm, Brooklyn Center, and Frederick Marvin Green, Bloomington, Minn., assignors to Control Data Corporation, Minneapolis, Minn., a corporation of Minnesota Filed Dec. 20, 1963, Ser. No. 332,045
4 Claims. (Cl. 340—172.5)

This invention relates to a data exchanger and more particularly, to apparatus for interconnecting various components of a digital computer to transfer information therebetween and for modifying the information during transfer.

In the past, digital computers have been provided with internal central distribution units for interconnecting separate portions of the computer. Provisions have also been made in other computer devices for modifying the information being processed by the computer. The latter arrangements generally employ special adder units, auxiliary registers, and the like for effecting this result. However, in none of these known arrangements is there combined a transfer device which may also function to modify the format of the information being transferred.

It is an object of this invention to provide a data exchanger internally of the computer for interconnecting the various computer components while simultaneously modifying the information passing through the exchanger.

Another object of the invention is to provide a data exchanger having code conversion facilities for changing the code of information translated through the exchanger.

An additional object of the invention is to provide a parity generating and checking system within a data exchanger which simultaneously transfers and modifies information.

Further objects and the entire scope of the invention will become more fully apparent when considered in the light of the following detailed description of an illustrative embodiment of the invention and from the appended claims.

The illustrative embodiment may be best understood by reference to the accompanying drawings, wherein.

Briefly, the invention comprises a logical arrangement wherein a plurality of paths are provided within the data exchanger, the number of paths being a function of the type of information on which the computer operates. The information to be transferred between separate sections of the computer is directed to the data exchanger, this information being divided among the paths. By means of the logical configuration, the information may be transferred directly through the exchanger or may be selectively shuffled to different paths within the exchanger during transition therethrough. In the latter case the resultant information thereafter transmitted from the exchanger to its final destination is in a modified format. During transition through the exchanger, the information may also be gated through a code converter, if desired, to further modify the information format. Parity generating and checking logic is also provided within the data exchanger to serve as an error detection arrangement.

Figure 1:
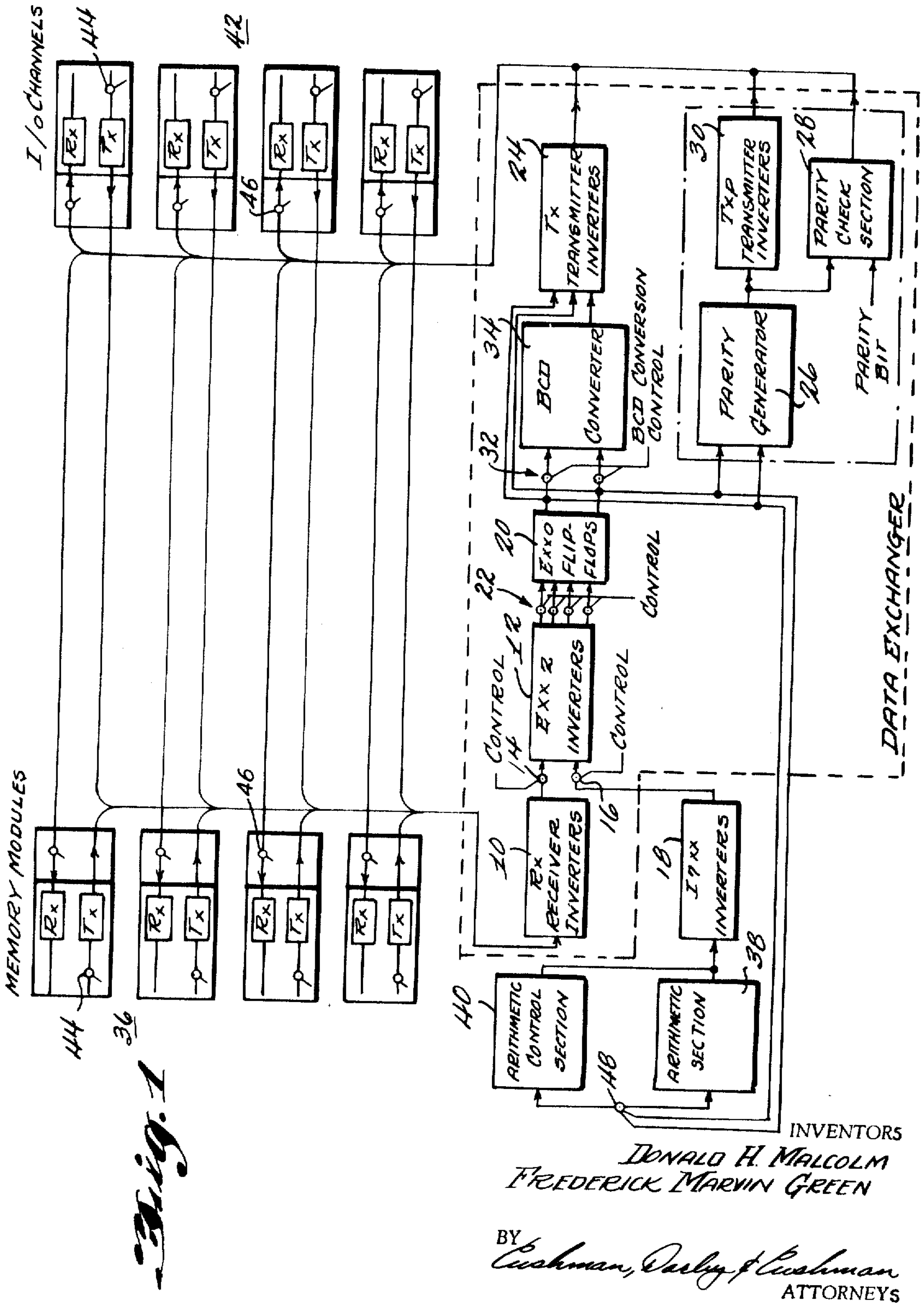
FIGURE 1 is a schematic block diagram of a data exchanger in the environment of a representative computer system.

Referring now to FIGURE 1 of the drawings, there is shown a computer arrangement which illustrates an environment in which the data exchanger which constitutes the invention may be employed. The data exchanger is shown as being within the area defined by the dash lines. The exchanger comprises a group of Rx Receiver Inverters 10, the outputs of which may be gated to a series of Exx2 Inverters 12 through an AND gate arrangement 14 under the direction of a programmed control signal, as shown. Also connectable as inputs to the Exx2 Inverters through an AND gate arrangement 16 are the outputs from I–7xx Inverters 18 which will be hereinafter described in greater detail. This gating is under the control of a second programmed control signal, as illustrated. The outputs of the Exx2 Inverters are selectively directed to Exx0 Flip-Flops 20 through an AND gate arrangement 22 under the direction of a shuffle control signal. In this diagram, the shuffle control signal is indicated as a single signal to the AND gate arrangement 22, but it will be understood that in fact the shuffle control signal is a program of signals to permit the setting of particular ones of the Exx0 Flip-Flops. The outputs of the Exx0 Flip-Flop arrangement 20 may be directly applied to Tx Transmitter Inverters 24. In addition, they are connected to a Parity Generator 26 which constitutes a portion of a parity system which includes a Parity Check Section 28 and a Parity Transmitter Txp 30. The Parity Check Section 28 compares the output of Parity Generator 26 with a parity bit included in information received by the data exchanger to determine whether an error in the transfer of the information has occurred. The information from the Exx0 Flip-Flops 20 may also be gated through an AND gate arrangement 32 to a Binary Coded Decimal Converter 34, hereinafter called the BCD Converter. This gating is accomplished under the direction of a programmed BCD conversion control signal, as illustrated.

The data exchanger forms an internal portion of the computer system and serves to transfer information between various sections of the computer. For purposes of illustration, three separate sections are shown. These comprise the Memory Modules, indicated generally at 36, which may be the internal storage system of the computer, such as magnetic core matrix. Another section which is internal of the computer is the Arithmetic Section 38 and its associated Arithmetic Control Section 40. The external portion of the illustrated computer arrangement is the plurality of Input-Output Channels, indicated generally at 42, which lead to peripheral equipment such as magnetic tape transports.

Communication between the Memory Modules 36 and the Input-Output Channels 42, hereinafter designated I/O Channels, is achieved through transmitters Tx associated with each of these portions. The Tx transmitters of Memory Modules 36 and the I/O Channels 42 are connected to the data exchanger to provide inputs to the Rx Receiver Inverters 10. The determination which storage area will supply information to the data exchanger is determined by the selective conditioning of AND gates 44 associated with each of the Tx transmitters, this conditioning being under the control of a memory reference cycle.

In transferring information from the data exchanger to either the Memory Modules 36 or the I/O Channels 42, the output of the Tx Transmitter Inverters 24 of the exchanger are selectively gated to appropriate Rx receivers associated with the Memory Modules and the I/O Channels. This selective gating is controlled by AND gates 46 associated with each Rx receiver under the direction of the memory reference cycle. As stated previously, the exchange of information from the Arithmetic Section 38 through the I–7xx Inverters 18 to the data exchanger is under the control of AND gate 16. The conditioning of an AND gate 48 permits transfer of information from the data exchanger to the Arithmetic Section 38 and its associated Arithmetic Control Section 40. The Rx Receiver Inverters 10 and the Tx Transmitters 24 of the data exchanger and the I–7xx Inverters 18 associated with the Arithmetic Section are employed to establish appropriate voltage levels for use within the data exchanger and during transmission from the exchanger to the appropriate destination.

From the foregoing description of an overall embodiment in which the data exchanger may be employed, it will be appreciated that there may be selective transmission from the Memory Modules 36, the Arithmetic Section 38 or the I/O Channels 42 into the data exchanger to transfer information therethrough to any selected destination. During the transfer of information through the data exchanger, the programmed shuffle control may modify, or rearrange, the translated information to transmit this information to its destination in a modified format. Also by selectively employing the BCD Converter, a code conversion of the information transferred through the data exchanger may be achieved. The parity system also operates on the information passing through the exchanger to generate and compare parity to provide an error indicator.

Figure 2:
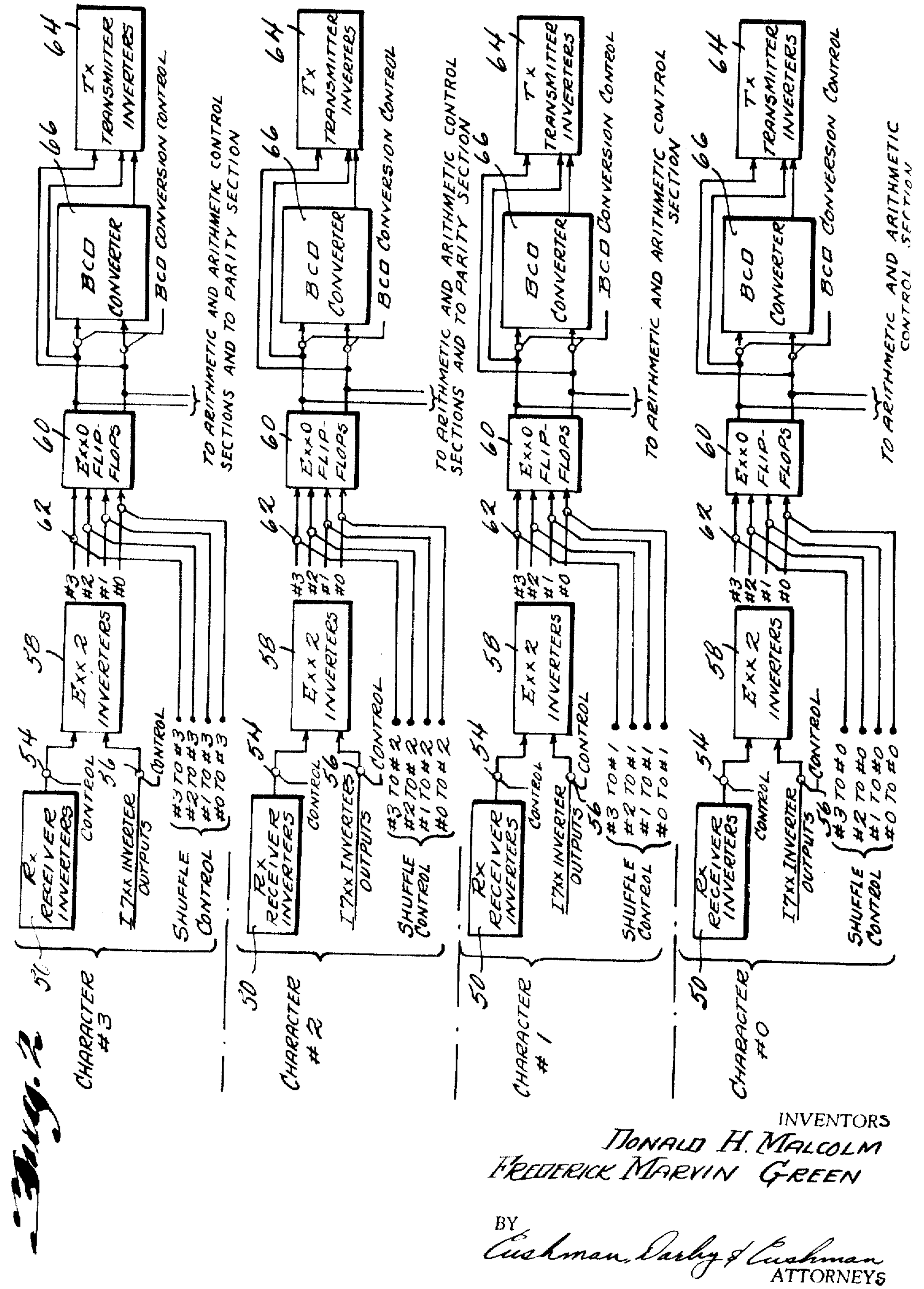
FIGURE 2 is a schematic block diagram of the principal elements of the data exchanger.

Now that the overall setting of a data exchanger has been established in a representative environment, the details of one embodiment of the data exchanger will be described with reference to FIGURES 2 and 3*a–d*. FIGURE 2 is a schematic block diagram, in more detail than that of FIGURE 1, indicating the principal portions of the data exchanger. For purposes of illustration, it will be assumed that the data exchanger is designed to operate on information in the form of a 24 bit word. It will further be assumed that the word is divided into four characters, each being 6 bits in length. In FIGURE 2, there are four similar levels illustrated, each level representing a character position. The details of this system will be described primarily with reference to the character #3 level. This level comprises the Rx Receiver Inverters 50, to which information from the Memory Modules and the I/O Channels may be directed, and the input lines from the I–7xx Inverters to which information from the Arithmetic Section may be applied. Depending on which of the respective control signals has been programmed, either AND gates 54 or AND gates 56 are conditioned to pass information to the Exx2 Inverters 58. The outputs of the Exx2 Inverters for the character #3 level are connected through AND gates to the Exx0 Flip-Flops 60. In addition, to the Exx0 Flip-Flops 60, there are connected through appropriate AND gates the outputs of the Exx2 Inverters of the character #2, character #1 and character #0 levels. The conditioning of these AND gates, indicated generally as 62, is determined by the programming of the shuffle control signal. It can be seen, therefore, that by appropriate conditioning of selected AND gates 62, information from any level of the data exchanger may be applied to the Exx0 Flip-Flops 60 of the character #3 level. Similarly, information from any level may be applied to the Exx0 Flip-Flops of any other levels by appropriate programming of the shuffle control signals. The outputs from the Exx0 Flip-Flops 60 may be transferred directly to the Tx Transmitter Inverters 64 for transmission to the Memory Modules or to the I/O Channels, through the BCD Converter 66 and thereafter to the Tx Transmitter Inverters 64 for transmission, or to the Arithmetic Section. The outputs of the Exx0 Flip-Flops 60 are also directed to the parity system, as indicated. However, for purposes to be hereinafter described in detail, it should be noted that the parity arrangements in the illustrative embodiment are associated only with the character #2 and character #3 levels.

Figure 3A:
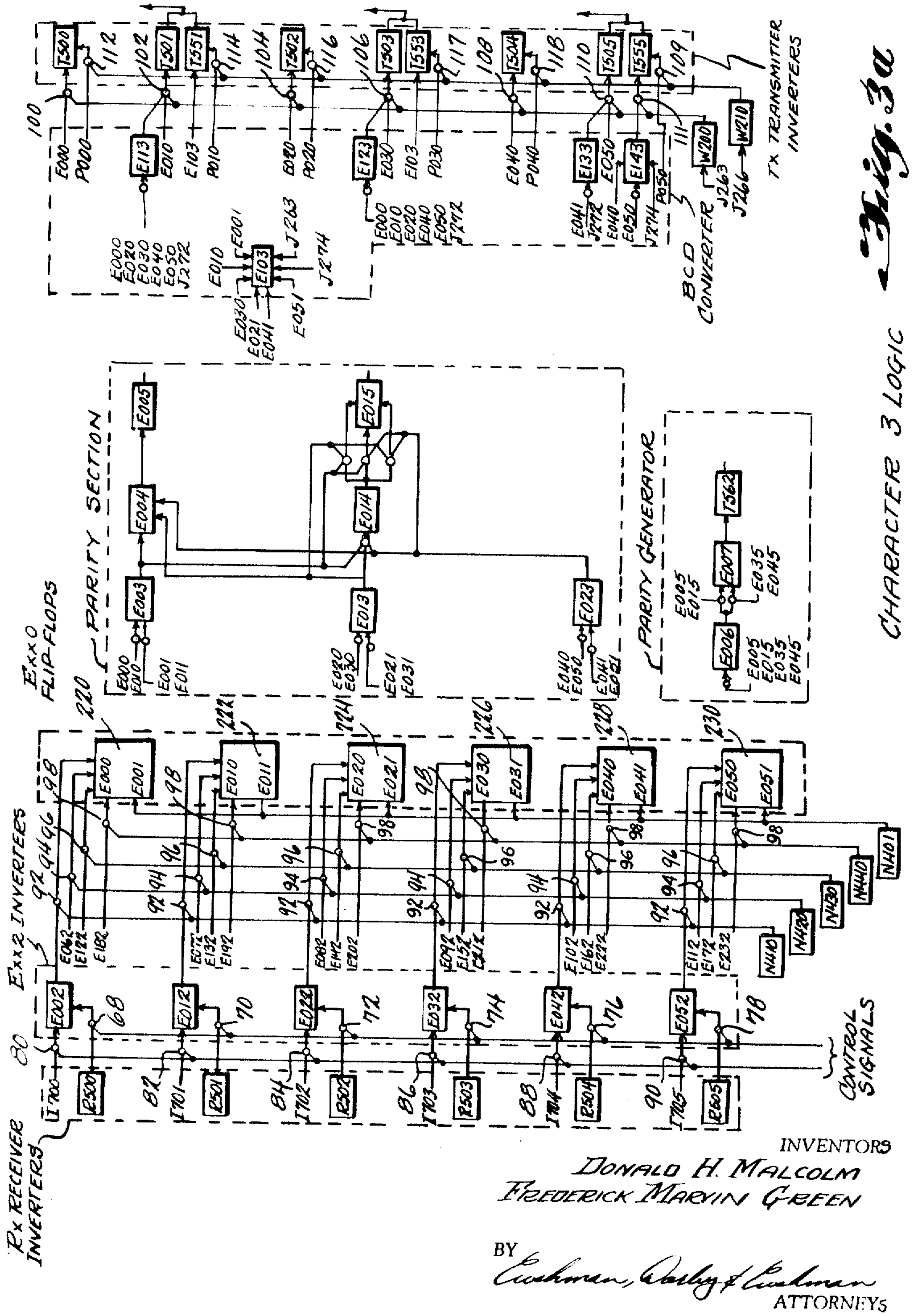
FIGURES 3*a–d* are logic diagrams of the data exchanger shown in block form in FIGURES 1 and 2.
Figure 3B:
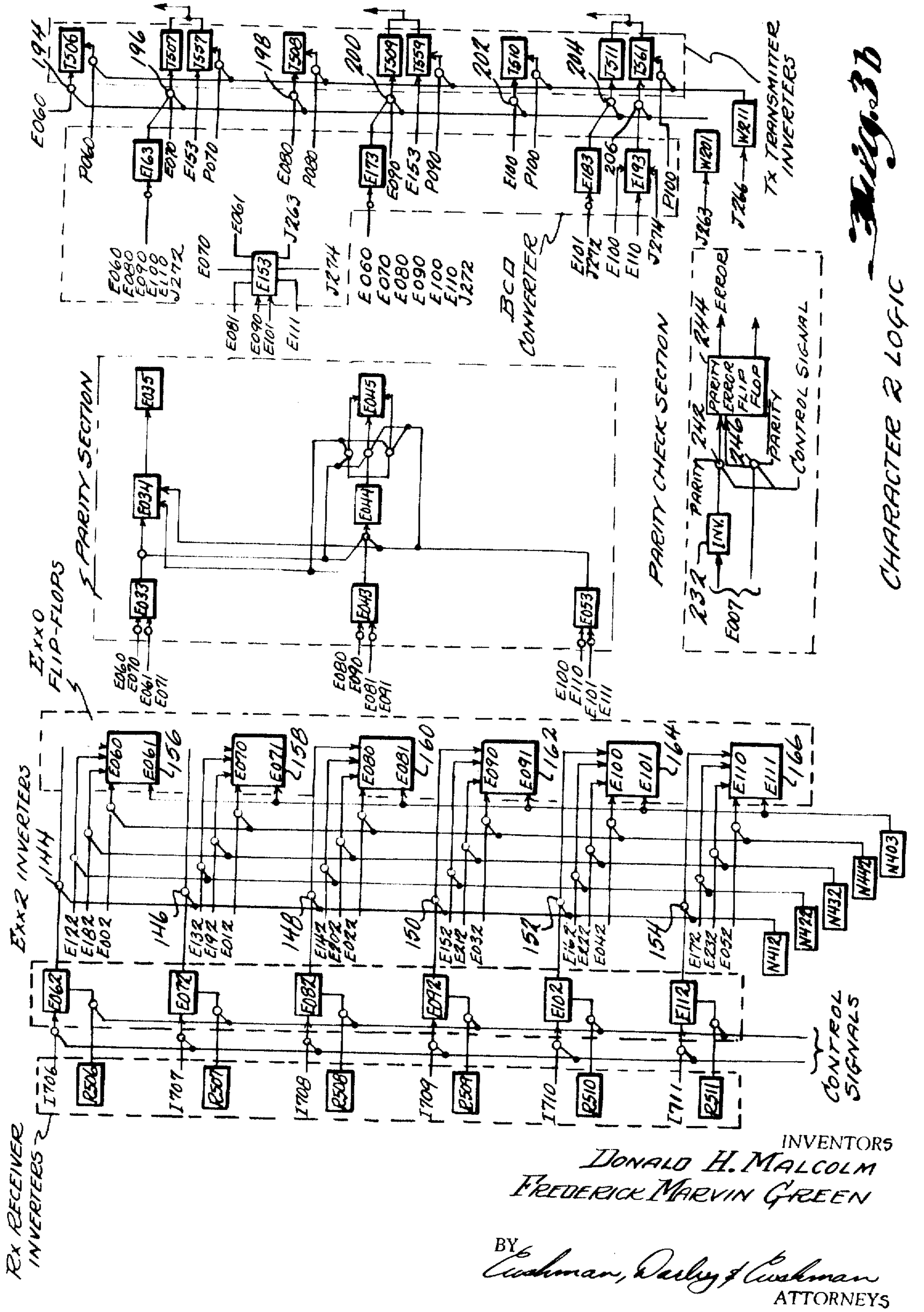

The precise logic of the illustrative data exchanger will be described in detail with reference to FIGURE 3*a* which is the logic diagram for the character #3 level of the data exchanger. The logic of the four levels of the data exchanger are identical with the exceptions that the Tx Transmitter Inverters of levels 0 and 1 are slightly different from those of levels 2 and 3 and, as stated previously, the parity system is associated with levels 2 and 3 only. Referring to FIGURE 3*a*, the Rx Receiver Inverters comprise inverters R500 through R505, each inverter associated with a given stage, or bit position, of the 6 bit character. Inverters R500 through R505 are connected to their associated Exx2 Inverters, E002–E052, through AND gates 68, 70, 72, 74, 76 and 78, respectively. These AND gates are conditioned on the application of the programmed control signal, as shown. Also serving as inputs to the Exx2 Inverters are the outputs of the I–7xx inverters, not shown, from the Arithmetic Section. These inputs are designated as I–700 through I–705 and are applied to the Exx2 Inverters through AND gates 80, 82, 84, 86, 88 and 90, respectively. Once again, the input from the I–7xx Inverters is only applied to the Exx2 Inverters when the programmed control signal conditions these AND gates. The output of E002 is connected through AND gate 92 to the set input line of its associated Exx0 Flip-Flop. Similarly, the outputs of the remaining Exx2 Inverters of the level #3 logic are connected through AND gates 92 to the set input lines of the respective Exx0 Flip-Flops. To the set input lines of the Exx0 Flip-Flops there also also connected the outputs of the corresponding stages of the Exx2 Inverters of the other character levels. For example, the output of inverter E062 of the character #2 logic arrangement is connected to the Exx0 Flip-Flop through AND gate 94. The output from the Exx2 Inverter E122 of the character #1 logic is connected through AND gate 96 to the Exx0 Flip-Flop and the output of inverter E182 of the character #0 logic is also connected through an AND gate 98 to this Exx0 Flip-Flop. To AND gates 92, 94, 96 and 98 there are connected respectively the outputs of inverters N410, N420, N430 and N440. These inverters comprise a portion of the programmed shuffle control arrangement to supply selective signals to their respective AND gates in order to achieve direct transmission through the data exchanger or to effect a shuffle of information from one character level to another. The inverter N401 comprises a portion of the program circuitry, this inverter serving to clear the Exx0 Flip-Flops before an information transfer cycle occurs. As stated in the general description of the apparatus, the outputs of the Exx0 Flip-Flops may be connected directly to the Tx Transmitter Inverters. For the character #3 logic, these inverters comprise inverters T500, T501, T502, T503, T504 and T505. The inputs to these transmitter inverters from the Exx0 Flip-Flops are under the control of a program signal from inverter W200 to condition AND gates 100, 102, 104, 106, 108, 110 and 111, respectively. The outputs of the Exx0 Flip-Flops may also be gated to the BCD Converter under the direction of a BCD Converter control signal generated by a programmed signal being applied to the inverter arrangement illustrated in FIGURE 3*c*. The operation of this arrangement will be described in detail hereinafter. The outputs of the BCD Converter of the level #3 logic, comprising the outputs of inverters E113, E123, E133 and E143, are also applied to the Tx Transmitter Inverters, the output of BCD Converter inverter E103 being directly connected to additional Tx Transmitter Inverters T551 and T553. Inverter E143 is gated under the control of the output of W200 to a still further Tx Transmitter Inverter T555. The outputs of T501 and T551 are combined to produce a resultant output as are the pairs of inverters T503 and T553, and T505 and T555. In the character #3 logic, a Parity Section is provided, as shown, which comprises a plurality of interconnected inverters and AND gates arranged in a logical configuration to produce a resultant output on inverters E005 and E015. Similarly, in the character #2 logic resultant outputs are produced on inverters E035 and E045 which are the output inverters of another Parity Section. The outputs of E005, E015, E035 and E045 are combined by a Parity Generator, shown in FIGURE 3*a*, to create an output at E007 which indicates the parity of the information transferred through the data exchanger. The output of E007 is applied to a Parity Check Section, illustrated in FIGURE 3*b*, to condition a Parity Error Flip-Flop. The setting of this flip-flop indicates that there has been an error in the transfer of information to or through the data exchanger.

Also indicated in the logic diagrams are a series of inputs P000, P010 etc. which are applied to the Tx Transmitter Inverters through AND gates 112, 114, etc., under the control of the output of inverter W210. These P terms are programmed information to effect special functions such as interrupt, return jump, etc. The input J266 is a programmed control signal for achieving these special functions by conditioning gates 112, 114, etc.

The logic coupling the BCD Converter to the Tx Transmitter Inverters in the character #1 and character #0 levels is slightly different that that employed in the character #3 and character #2 levels. However, since this precise logic does not constitute a part of the invention, the minor differences will not be discussed since it is obvious that one skilled in the art could arrange the logic to achieve the desired results in accordance with the conversion system to be described with reference to the operation of the system.

Now that the basic structure of the data exchanger has been described, a typical cycle of operation will be set forth. For purposes of illustration, it will be assumed that information is being transferred from an I/O Channel to one of the Memory Modules. The I/O Channel will be considered as connected to a piece of peripheral equipment such as a tape transport for moving magnetic tape on which information is recorded on seven tracks. Data information is recorded on six of these tracks and parity information is available on the seventh. From the definition of the word length set out hereinbefore, it will be obvious that a single six-bit character may be recorded on one transverse section of the tape. However, the Data Exchanger normally receives the 24 bit word in two transmissions. During each transmission, two six-bit characters and a parity bit, a total of thirteen bits of data information, will be passed. A data assembler is generally used to receive the single six-bit characters and its associated parity bit from the tape transport. The Data Assembler then assembles the single six bit character into twelve bits of data information and generates a parity bit. Thereafter, the thirteen bits of data information is passed to the Data Exchanger. Therefore, four reading operations must occur in order to read a 24 bit word from the tape transport while the data information is passed via a Data Assembler over the I/O Channel to the Data Exchanger in two six bit characters per transmission.

The sample operation which is performed by the data exchanger of the invention to illustrate its functioning is to transfer the character #1 and character #3 information directly through the exchanger to be placed in storage in one of the Memory Modules whereas the character #2 and character #0 information are interchanged, or shuffled, during translation through the data exchanger. The information which is transferred and shuffled during passage through the data exchanger is, for purposes of illustration, the following word:

Character:

| | |
|---|---|
| #0 | 101101 |
| #1 | 001011 |
| #2 | 111001 |
| #3 | 101010 |

In this 24 bit word, the 6 bits of character #0 comprise the highest order bits and the character #3 bits are those of lowest order, and within each character the order ascends from right to left. In reading the information from the magnetic tape, characters #0 and #1 are read first and are transmitted to the data exchanger along with the parity bit associated with these two characters. The characters #2 and character #3 information is read on a second reading cycle and is transmitted with its associated parity bit to the exchanger. The connections from the I/O Channels to the data exchanger are such that these channels are directly connected to the Rx Receiver Inverters of the character #2 and character #3 levels, respectively. The parity bits are transmitted to the Parity Check Section of the exchanger. In this illustrated embodiment, the parity bit is a logical "1" when the number of "1's" in the 12 bits of data are even and is a logical "0" when the 12 bits are odd.

Since the character #0 and character #1 information is directed over the I/O Channel to the data exchanger in the first reading cycle, this information will be directed to the character #2 and character #3 logic, respectively. Accordingly, as inputs to the Rx Receiver Inverters R500 through R505, respectively, are the following bits:

110100 and to the Rx receiver inverters R506 to R511 are the respective bits:

101101

Considering first the character #3 level, no control signal is applied to AND gates 80, 82, 84, 86, 88, and 90 since information from the Arithmetic Section is not desired. Therefore, the outputs of these gates are logical "0's." However, a control signal is applied to AND gates 68, 70, 72, 74, 76, and 78 to thereby pass the information at the outputs of the Rx Receiver Inverters to the Exx2 Inverters of character #3 level. Accordingly, a double inversion of the information applied to the Rx Receiver Inverters is achieved and the outputs of the Exx2 Inverters of character #3 level are:

110100 for inverters E002, E012, E022, E032, E042, and E052, respectively. By a similar operation, the outputs of the Exx2 Inverters of the character #2 level are:

101101 for inverters E062, E072, E082, E092, E102, and E112, respectively. By the logical arrangement of the data exchanger, the outputs of the Exx2 Inverters of the character #3 and character #2 levels are connected through AND gates to the set input lines of the Exx0 Flip-Flops of all character levels. In the illustrative problem, it is desired to transfer the character #1 information through the character #1 level of the data exchanger. Accordingly, in the character #1 level, AND gates 120, 122, 124, 126, 128, and 130 are conditioned by a programmed signal output from inverter N434 to pass the information on the output lines of the Exx2 Inverters of the character #3 level to the Exx0 Flip-Flops of the character #1 level. Accordingly, Flip-Flops 132, 134, and 138 are set, the remaining Flip-Flops 136, 140, and 142 remaining cleared. By this procedure, the information in the character #3 level has been shuffled to the character #1 level and is ready for transmission therefrom.

The sample operation presented also requires the translation of the character #0 information through the character #2 level. Therefore, under the direction of the computer program, an output is obtained from inverter N412 to condition AND gates 144, 146, 148, 150, 152, and 154 thereby passing the information at the outputs of inverters E062, E072, E082, E092, E102, and E112 to the Exx0 Flip-Flops of the character #2 level. Accordingly, flip-flops 156, 160, 162, and 166 are set. The remaining flip-flops of the Exx0 Flip-Flops of level #2 remain cleared. By this procedure, the character #0 information is ready for transmission from the character #2 level.

Before explaining the logic of the transmission arrangement, the parity generating and check systems, and the BCD converter, it will be necessary to describe the actual construction of the Exx0 Flip-Flops in order that the outputs of these flip-flops may be appreciated. Each of the flip-flops comprises a pair of single inverters which are interconnected such that an output of one of the inverters is connected to the input of the other and vice versa to create a bi-stable device. This type of flip-flop arrangement is fully described in Patent 3,165,584, assigned to the present assignee. Relating this description to the flip-flops illustrated in the logic diagrams, reference will be made to Flip-Flop 156 which comprises inverters E060 and E061 which are interconnected as just explained. By the interconnection a second output from inverter E060 serves as the clear output line of the flip-flop and an additional output line from inverter E061 serves as the set output line. Accordingly, on the logic diagrams the input terms Exx0 indicate the condition of the clear output lines of the respective flip-flops and the terms Exx1 indicate the condition of the set output lines from the associated flip-flops.

Referring now to the character #1 level, the transmission of the information will be described. Under the assumed problem, the information received from the I/O Channel is in binary format and is to be transmitted to a Memory Module in this manner. Accordingly, there is no BCD conversion. A determination of whether there will be conversion is dictated by the program of the system which, in the event of conversion, applies a logical "1" to the input of inverter J271 of the BCD Converter Control. Since this control is made up of several inverters, the outputs of the interconnected inverters J271 to J274 are "0," "1," "1," and "0," respectively. The contrary is true if there is no BCD conversion. The BCD Converter of the character #1 level includes inverters E203, E213, E223, E233 and E243. To inverters E203 and E243 the output of inverter J274 is directly connected. Since in the case of no conversion, the output of J274 is a logical "1," the outputs of the inverters to which J274 is directly applied are logical "0's." The inputs of remaining inverters of the BCD Converter of character #1 level are determined by the condition of AND gates 168, 170 and 172. To each of these gates is applied the J273 term which, in the case of no BCD conversion, is a "0." Therefore, one of the inputs to inverters E213, E223 and E233 is a "0." The remaining input to these inverters is a programmed input J264 which is also a "0" resulting in logical "1" outputs from these three inverters. The J264 term is also applied to an inverter W202 to condition AND gates 174, 176, 178, 180, 182, 184 and 186. The outputs of the Exx0 Flip-Flops and the BCD converters are applied as inputs to these AND gates as indicated. The outputs of the AND gates are connected to the Tx Transmitter Inverters T512 to T517. To inverters T512, T563 and T514 there is also applied the outputs of additional AND gates 188, 190 and 192, respectively. However, these AND gates are not conditioned since the J266 term applied to inverter W212 is the complement of the J264 term. Therefore, the outputs of these AND gates are logical "0's." The outputs of inverters T513 and T563 are connected to provide a common output. With the Exx0 Flip-Flops of the character #1 level set as previously described, and no BCD conversion, the transmitted output of the character #1 level is from lowest to highest order bit:

110100

Considering now the information in the character #2 level, the same fundamental operation occurs as was described with reference to the character #1 level. Since there is no BCD conversion, the output of the inverters E153 and E193 are logical "0's" and the outputs of E163, E173 and E183 are logical "1's." The program term J263 is inverted to condition AND gates 194, 196, 198, 200, 202, 204 and 206 to apply the binary information to the Tx Transmitters. The outputs of these inverters from lowest to highest order bits are:

101101

Now that the transferring function of the data exchanger has been described with binary information being translated directly through the exchanger in the case of one of the input characters, and shuffled in the case of the other character, the parity arrangement will be described. As was pointed out in the description of the structure of the device, in the illustrative embodiment there are Parity Sections provided only in character #2 and character #3 levels. Accordingly, all input characters on which a parity operation is to be performed must be presented to the Parity Sections in these levels. As was stated previously, the incoming character #1, which was transmitted on the I/O Channel to the character #3 level and then shuffled to its appropriate character #1 level for transmission, must also be directed to the Parity Section of character #3 level. To accomplish this, inverter N410 of the character #3 level is connected to the program control to condition AND gates 92 to connect the outputs of the Exx2 Inverters E002, E012, E022, E032, E042 and E052 to the set input lines of the respective Exx0 Flip-Flops of the character #3 level. Accordingly, Flip-Flops 220, 222 and 226 are set and the remaining Exx2 Flip-Flops 224, 228 and 230 remain cleared. The set and clear output lines of these flip-flops are connected, as shown, to the Parity Section to produce logical "1's" at the outputs of inverters E005 and E015 under this problem situation. Similarly, the outputs of the Exx2 Flip-Flops of character #2 level are connected, as shown, to their respective Parity Section to produce a logical "1" at the output of E035 and a logical "0" at the output of E045. The outputs of the two Parity Sections are then combined in the Parity Generator of FIGURE 3*a* to develop a logical "0" at the output of inverter E007. This output is compared with the parity bit transmitted on the I/O Channel to the data exchanger to determine whether there has been any error during transmission. The Parity Check System, illustrated in FIGURE 3*b*, comprises an inverter 232, the output of which is connected through an AND gate 242 to the set input line of a Parity Error Flip-Flop 244. Inverter 232 is connected to the output of inverter E007. Similarly, the output of E007 is connected to the input of an AND gate 246, the output of which is also connected to the set input line of Flip-Flop 244. Connected to both AND gates 242 and 246 is a control line. Another input to the AND gate 242 is the parity bit, and to the AND gate 246 the complement of the parity bit is provided as an input. In the operative example described herein, the total number of "1's" in the transmitted characters #0 and #1 is odd. Therefore, the parity bit transmitted to the data exchanger is a logical "0" and its complement a logical "1." Since the parity bit is a "0," gate 242 is not conditioned and since the output of E007 is a "0," gate 246 is also not conditioned. Accordingly, the Parity Error Flip-Flop remains cleared indicating that no error has occurred during transmission and transfer.

The foregoing describes completely the operation of the data exchanger in handling the transfer and shuffling of the characters #0 and #1 transmitted to the data exchanger from the I/O Channel. The determination of which I/O Channel is employed is a function of suitable gating means external to the data exchanger and the transmission of the information from the data exchanger to the selected Memory Module is controlled as a function of appropriate gating external to the data exchanger. It will further be obvious from the description of the operation of the exchanger with reference to character #0 and character #1, that information is available for transmission on the Tx Transmitter Inverters of the characters #3, #2 and #1 levels. Of course, it is desired to prevent the memory from accepting the information on the Tx Transmitter Inverter outputs of the character #3 level and this is appropriately accomplished by the memory reference cycle of the modules which will disregard this information and not store it. For this example, the memory reference cycle is such that two characters are stored at a time in the Memory Module and by appropriate programming of the memory reference in accordance with the program controlling the data exchanger, the memory may be conditioned to receive only the outputs of the Tx Transmitter Inverters of character #2 and #1 levels during the operation on the character #0 and #1 inputs to the exchanger.

Based on the foregoing description of operation of the data exchanger, it will be obvious that the characters #2 and #3 read from the magnetic tape will be transmitted over the I/O Channels to the characters #2 and #3 levels of the exchanger and will be transferred and shuffled in the same manner as described with reference to characters #0 and #1 in order to permit transmission of the character #2 information from the Tx Transmitter Inverters of the character #0 level and the character #3 information from the Tx Transmitter Inverters of the character #3 level. Once again, the memory reference cycle will disable the memory module such that the character #2 information available at the character #2 level Tx Transmitter Inverters will be disregarded.

To indicate alternative methods of employing the data exchanger described, information may be transmitted from the Memory Modules to an I/O Channel via the data exchanger. Once again, characters #0 and #1 are read first and in this case may be received by the corresponding character level of the data exchanger from which the information may be translated. In the cases of characters #0 and #1, a shuffling to the characters #2 and #3 positions for parity generation is required. The information may also be shuffled to place the transferred information at the Tx Transmitter Inverters of any desired level by the processes heretofore described. When data is passed from the Data Exchanger to a peripheral device, the parity bit generated by the Data Exchanger is checked by the peripheral device. If a parity error occurs, this is noted by the peripheral device and the data information wherein a parity error occurred is re-written. Also, when data is re-read from a magnetic tape, the parity bit is checked immediately for an error. If an error occurs, that portion of the tape is re-read. If an error does not occur, that data information is passed to the data assembler, which, as stated previously, is used with a magnetic tape arrangement. Thereafter, the data information is passed from the data assembler to the Data Exchanger, where parity is again checked for error. Once again, the controlling of the readout of the information from the memory and its transmission after passing through the data exchanger to the peripheral equipment is under the control of the memory reference cycles.

Also by suitable gating means, the Arithmetic Section may be connected to the output of the Exx0 Flip-Flops. Under the control of the memory reference cycle, information from the memory modules or from the peripheral equipment over the I/O Channels may be introduced to the Arithmetic Section, and information from the Arithmetic Section may be transferred through the exchanger to any desired location. The usual format for information applied to the Arithmetic Section is binary information rather than BCD. However, if the Arithmetic Section were programmed to operate on BCD information, the data exchanger could be modified to the extent that the output from the BCD Converter could be connected to the Arithmetic Section for selective gating thereto.

Figure 3C:
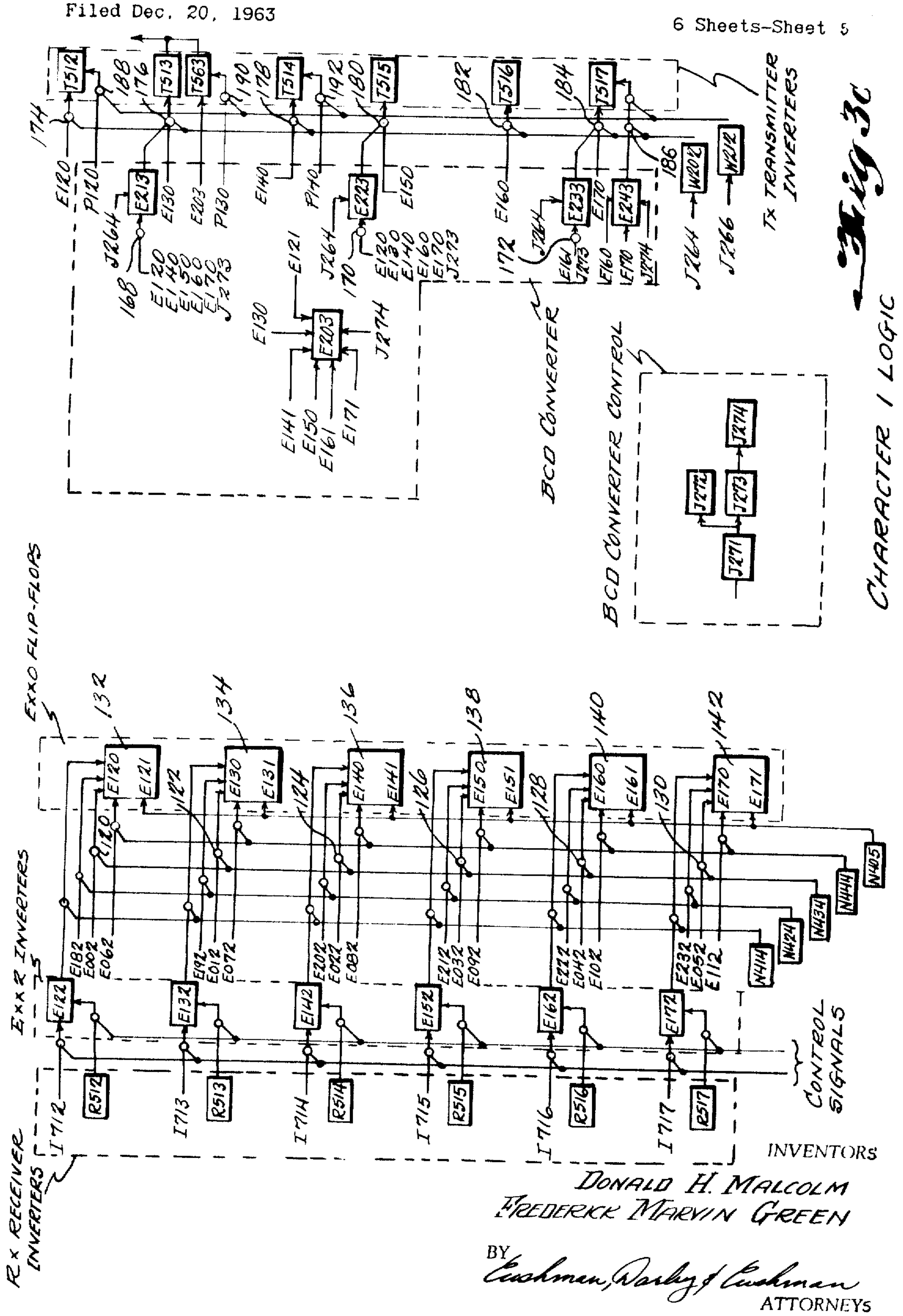
Figure 3D:
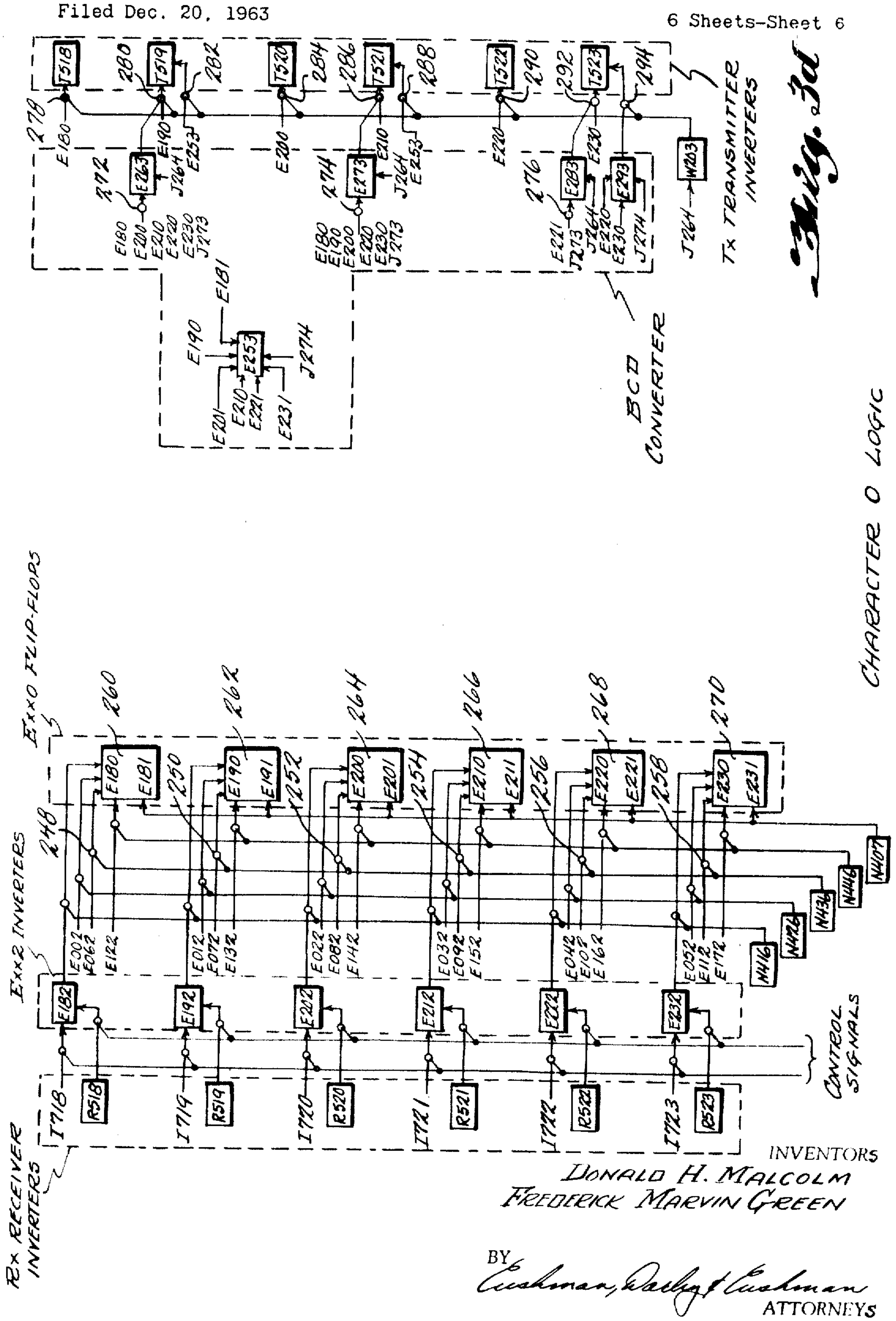

To illustrate the operability of the BCD Converter, it will be assumed that the character #2 used in the previous example has been shuffled to the character #0 level of the data exchanger and is transferred therethrough by programming inverter N436 to condition gates 248, 250, 252, 254, 256 and 258 to pass this information to the set input lines of the Exx0 Flip-Flops 260, 262, 264, 266, 268 and 270. Accordingly, Flip-Flops 260, 266, 268 and 270 are set and the remaining flip-flops are cleared. Since BCD conversion is to take place, the term J273 developed as shown in FIGURE 3c, is programmed as a logical "1" and J274 is therefore a logical "0." The inputs to inverter E253 of the BCD converter are, accordingly, partially "1's" and partially "0's" so its output is a logical "0." Similarly, the inputs to AND gates 272 and 274 are such that the gates are not conditioned thereby supplying logical "0" inputs to inverters E263 and E273. However, the terms E221 and J273 to AND gate 276 are "1's" thereby conditioning this gate to provide a logical "1" input to inverter E283. The inputs to inverter E293 are all logical "0's" so its output is a logical "1." Since the term J264 is "0," the outputs of both E263 and E273 are "1's" and the output of E283 is a "0." The outputs of the Exx0 Flip-Flops and the BCD converter are appropriately applied to AND gates 278, 280, 282, 284, 286, 288, 290, 292 and 294 to produce an output from Tx Transmitter Inverters T518 to T523 of:

100110

This output is information displayed in Binary Coded Decimal format. The particular logic of the BCD Converter is arranged to translate binary information according to the following formula:

If the input information is 001010 ($12_8$), convert to 000000 ($0_8$).

If the input information is 000000 ($0_8$), convert to 001010 ($12_8$).

If the fourth stage of the binary information (the fifth most significant bit) is a "1," complement the fifth stage (the sixth most significant bit).

Applying this formula to the illustrative example, the information converted was the character 111001. Since the fourth stage is a "1," the fifth stage is complemented from a "1" to a "0" to produce the result 011001 which corresponds to the respective outputs of inverters T518 to T523, as described, the output of T523 being the most significant bit.

The above described formula is that which is commonly employed to convert binary information for storage on magnetic tape in BCD code.

The above described embodiment is illustrative of one preferred embodiment of the invention but is not intended to limit the possibilities of insuring a simultaneous transfer of information between separate portions of a computer system and shuffling of this information during transfer. The embodiment disclosed is for the transfer of word lengths of 24 bits and although the operation was described with reference to the transfer of 12 bits at a time from one portion of the computer system to the other, it will be understood that under certain circumstances there may be simultaneous transfer and shuffling of 24 bits. Similarly, it will be understood that other arrangements having greater illustrative capacity may be designed utilizing the inventive features disclosed. The data exchanger design set forth herein is an example in which the inventive features of this disclosure may be utilized, and it will become apparent to one skilled in the art that certain modifications may be made within the spirit of the invention as defined by the appended claims.

What is claimed is:

1. In a computer system wherein information is selectively transferred among computer components, a data exchanger interconnecting said components, said data exchanger comprising: a plurality of receiver means each receiving a separate portion of said information and applying its received information portion to an individual transfer path associated therewith; a separate transmitter means in each of said transfer paths; and simultaneously operative means for selectively and directly interconnecting each transfer to any other transfer path to permit an information portion to pass from a given receiver to any one of the transmitters.

2. In a computer system as set forth in claim 1, said data exchanger further comprising code conversion means associated with each of said paths, each of said conversion means being connected to the transmitter means of its respective path, and means for selectively connecting each of said receiver means to the code conversion means associated with each path to thereby change the code of the information transferred through the exchanger.

3. In a computer system as set forth in claim 1, said data exchanger further comprising parity generating means connected to at least a portion of the plurality of transfer paths for generating parity information relating to the information being transferred through the exchanger, and parity checking means for comparing generated parity information with parity information carried by the information applied to the data exchanger to detect errors in the transferred information.

4. In a computer system as set forth in claim 2, said data exchanger further comprising parity generating means connected to at least a portion of the plurality of transfer paths for generating parity information relating to the information being transferred through the exchanger, and parity checking means for comparing generated parity information with parity information carried by the information applied to the data exchanger to detect errors in the transferred information.

References Cited

UNITED STATES PATENTS

| | | | |
|---|---|---|---|
| 3,170,144 | 2/1965 | Haynes | 340—173.1 |
| 3,119,098 | 1/1964 | Meade | 340—172.5 |
| 3,107,342 | 10/1963 | Estrems et al. | 340—172.5 |
| 2,872,666 | 2/1959 | Greenhalgh | 340—172.5 |
| 3,226,688 | 12/1965 | Amdahl et al. | 340—172.5 |
| 3,228,005 | 1/1966 | Delmege et al. | 340—172.5 |
| 3,268,874 | 8/1966 | Beck | 340—172.5 |
| 3,300,764 | 1/1967 | Doelz et al. | 340—172.5 |

PAUL J. HENON, *Primary Examiner.*

P. L. BERGER, *Assistant Examiner.*

UNITED STATES PATENT OFFICE
CERTIFICATE OF CORRECTION

Patent No. 3,348,207

October 17, 1967

Donald H. Malcolm et al.

It is hereby certified that error appears in the above numbered patent requiring correction and that the said Letters Patent should read as corrected below.

Column 10, line 70, after "transfer", first occurrence, insert -- path --.

Signed and sealed this 31st day of December 1968.

(SEAL)
Attest:

Edward M. Fletcher, Jr.
Attesting Officer

EDWARD J. BRENNER
Commissioner of Patents